United States Patent
Jia et al.

(10) Patent No.: US 9,692,548 B2
(45) Date of Patent: Jun. 27, 2017

(54) TECHNIQUES FOR BLIND EQUALIZATION OF HIGH-ORDER QUADRATURE AMPLITUDE MODULATION SIGNALS

(71) Applicant: ZTE Corporation, Shenzhen (CN)

(72) Inventors: Zhensheng Jia, Morganville, NJ (US); Hung-Chang Chien, Bridgewater, NJ (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/661,850

(22) Filed: Mar. 18, 2015

(65) Prior Publication Data

US 2015/0270921 A1    Sep. 24, 2015

Related U.S. Application Data

(60) Provisional application No. 61/955,636, filed on Mar. 19, 2014.

(51) Int. Cl.
*H04J 14/06* (2006.01)
*H04L 1/00* (2006.01)
*H04B 10/61* (2013.01)

(52) U.S. Cl.
CPC ............ *H04J 14/06* (2013.01); *H04B 10/612* (2013.01); *H04B 10/613* (2013.01); *H04B 10/6165* (2013.01); *H04B 10/6166* (2013.01); *H04L 1/0036* (2013.01); *H04L 1/0054* (2013.01)

(58) Field of Classification Search
CPC .............. H04B 10/613; H04B 10/6165; H04B 10/6166
USPC ......................................... 398/25, 9, 202, 205
See application file for complete search history.

(56) References Cited

U.S. PATENT DOCUMENTS

| | | | |
|---|---|---|---|
| 2008/0018881 A1* | 1/2008 | Hui .................. | G01S 7/4917 356/5.09 |
| 2011/0318021 A1* | 12/2011 | Zhou ................. | H04B 10/611 398/202 |
| 2012/0134676 A1 | 5/2012 | Kikuchi | |
| 2012/0269513 A1* | 10/2012 | Abe ................... | H04B 10/532 398/65 |
| 2015/0171972 A1* | 6/2015 | Xie .................... | H04B 10/616 398/205 |

(Continued)

OTHER PUBLICATIONS

Fan ["Fast Blind Equalization with Two-Stage Single/Multilevel Modulus and DD Algorithm for High Order QAM Cable Systems" IEEE 2008].*

(Continued)

*Primary Examiner* — Oommen Jacob
(74) *Attorney, Agent, or Firm* — Perkins Coie LLP

(57) ABSTRACT

A blind equalization technique of high-order QAM signals is provided. A method implemented at a receiver-side in an optical communication network receives an optical signal and performs a two-step polarization tracking process on the received optical signal. Using another method, a polarization multiplexed optical transmission is received by a receiver and a polarization tracking process is performed by applying two different algorithms in parallel. One algorithm may be a decision directed least means square (DD-LMS) algorithm. Another algorithm may be a constant modulus algorithm (CMA).

15 Claims, 13 Drawing Sheets

(56) References Cited

U.S. PATENT DOCUMENTS

2015/0270921 A1* 9/2015 Jia .................. H04B 10/6165
398/25

OTHER PUBLICATIONS

Rao ["New Concurrent Modulus Algorithm and Soft Decision Directed Scheme for Blind Equalization" ESIAT 2011].*
Chang ["Symmetry-Constrained Concurrent CMA and DD Algorithm for Adaptive Multi-Antenna System" VTF Fall, IEEE 2013].*
Faruk ["Blind Equalization and Carrier-Phase Recovery in QPSK Coherent Optical Receivers Based on Modified Constant-Modulus Algorithm" OECC/CPS 2013].*
Fan, C.-P., et al., "Fast Blind Equalization with Two-Stage Single/Multilevel Modulus and DD Algorithm for High Order QAM Cable Systems," IEEE International Symposium on Circuits and Systems (ISCAS '08), Seattle, Washington, U.S.A., pp. 3001-3004, May 2008.
Kobayashi, T., et al., "120-Gb/s PDM 64-QAM transmission over 1,280 km using multi-staged nonlinear compensation in digital coherent receiver," Optical Fiber Communication Conference and Exposition and the National Fiber Optic Engineers Conference (OSA/OFC/NFOEC 2011), Paper OThF6, pp. 1-3, Mar. 2011.
Kurakake, T., et al., "A Blind 1024-QAM Demodulator for Cable Television," International Zurich Seminar on Communications (IZS), pp. 136-139, Feb. 2004.
Nowlan, S., et al., "A Soft Decision-Directed LMS Algorithm for Blind Equalization," IEEE Transactions on Communications, 41(2):275-279, Feb. 1993.
Savory, S., "Digital filters for coherent optical receivers," Optics Express, 16(2):804-817, Jan. 2008.
Zhou, X., et al., "Low-Complexity, Blind Phase Recovery for Coherent Receivers Using QAM Modulation," Optical Fiber Communication Conference and Exposition and the National Fiber Optic Engineers Conference (OSA/OFC/NFOEC 2011), Paper OMJ3, pp. 1-3, Mar. 2011.
Extended European Search Report mailed on Aug. 4, 2015 for European Application No. 15275076.6, filed on March 18, 2015 (10 pages).
Morsy-Osman, M., et al., "Ultrafast and low overhead training symbol based channel estimation in coherent M-QAM single-carrier transmission systems," Optical Express, 20(26):B171-B180, Nov. 2012.
Savory, S.J., et al., "Digital Equalisation of 40Gbit/s per Wavelength Transmission over 2480km of Standard Fibre without Optical Dispersion Compensation," 2006 European Conference on Optical Communications, Cannes, France, pp. 1-2, Sep. 2006.
Xu, X., et al., "Decision Directed Least Radius Distance Algorithm for Blind Equalization in a Dual-polarization 16-QAM System," Optical Fiber Communication Conference and Exposition and the National Fiber Optic Engineers Conference (OFC/NFOEC 2012), Paper OM2H.5, pp. 1-3, Mar. 2012.

* cited by examiner

TECHNIQUES FOR BLIND EQUALIZATION OF HIGH-ORDER QUADRATURE AMPLITUDE MODULATION SIGNALS

CROSS REFERENCE TO RELATED APPLICATIONS

This patent document claims the benefit of priority of U.S. Provisional Patent Application No. 61/955,636, filed on Mar. 19, 2014. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

This document describes technologies, among other things, for blind equalization techniques of high-order Quadrature Amplitude Modulation (QAM) signals. Using the disclosed techniques, performance of a digital coherent optical system can be improved. For example, a digital coherent optical system can provides fast convergence speed and low feedback error compared to conventional techniques.

In one aspect, a method of optical communication, implemented at a receiver-side in an optical communication network is provided. The method includes receiving a polarization multiplexed optical signal and performing a two-step polarization tracking process on the received optical signal to recover data carried by the polarization multiplexed optical signal.

In another aspect, a method of optical communication, implemented at a receiver-side in an optical communication network is provided. The method includes receiving a polarization optical transmission; and performing a polarization tracking process by applying two different algorithms in parallel.

In another aspect, an optical receiver apparatus is disclosed. The apparatus includes a receiver module that receives an optical signal, a polarization tracking module that calculates feedback error and updating FIR filter coefficients by performing a two-step polarization tracking process on the received optical signal, thereby providing digital signals and a carrier recovery module receiving the digital signals and estimating an optimal phase angle of the digital signals.

In yet another aspect, an optical receiver apparatus is provided and includes a receiver module receiving an optical signal, a polarization tracking module calculating feedback error and updating FIR filter coefficients by performing a polarization tracking process by applying two different algorithms in parallel, and a carrier recovery module receiving a digital signal corresponding to the equalized symbols and estimating an optimal phase angle of the digital signals.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

Figure 1:
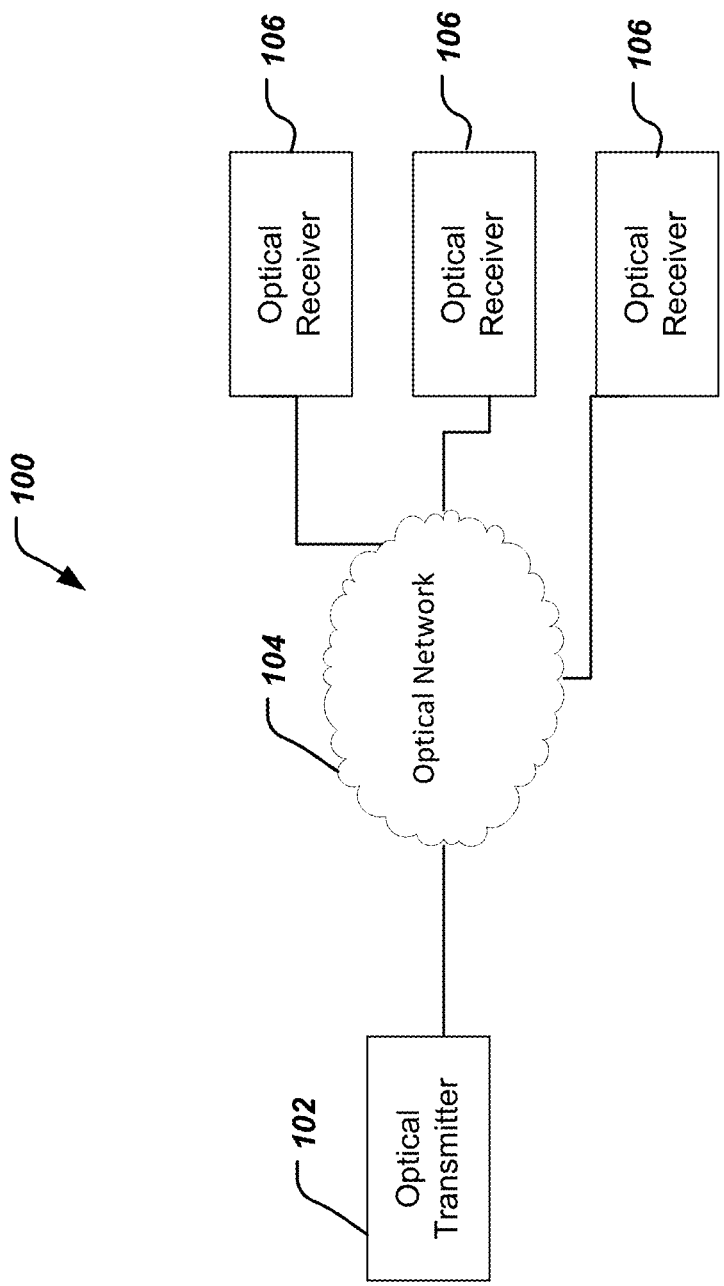
FIG. 1 depicts an example of an optical communication system.

FIG. 1 depicts an optical communication system 100 in which the presently disclosed technology can be embodied. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity.

Bandwidth demand for Internet and private line service continues to grow at around 30% to 50% per year driven by more and more video streaming and proliferation of cloud computing, big data, social media, and mobile data delivery. This trend combined with the desire of cost reduction per bit per Hz makes higher spectral efficiency (SE) and thus larger capacity of underlying optical transmission systems attractive. At present, the 100-Gb/s long-haul systems, whether in development or in deployment, are all based on single-carrier polarization division multiplexed quadrature phase shift keying (PDM-QPSK) modulation format associated with coherent detection and digital signal processing (DSP). The achieved spectral efficiency (SE) is 2 bits/s/Hz over conventional 50-GHz optical grid and thus the system capacity has been increased to around 10 Tb/s in fiber C-band transmission window.

High-order QAM modulation may be one way to sustain traffic growth as the higher order modulation (e.g., constellations that are greater than 16 QAM) enable to reach SE much higher than that of PDM-QPSK. A SE exceeding 4 bit/s/Hz with high-order QAM modulation format can be expected thus an ultra-large wavelength-division multiplexing (WDM) capacity of >40 Tbit/s by fully utilizing the finite bandwidth over the C- and L-bands in a single fiber.

High-order QAM is widely used in digital cable transmission system, in which 256-QAM modulation format was specified in Data Over Cable Service Interface Specification (DOCSIS 3.0) for single-carrier system, and 4096-QAM format has been proposed for multi-carrier situation in combination with low-density parity-check (LDPC) correcting channel coding. Blind adaptive equalizers have been proposed for signal demodulation in digital receivers in such systems. However, these methods cannot be presently directly used in digital coherent optical systems because of different channel impairments and equalization mechanisms such as polarization mode dispersion, polarization tracking, carrier frequency offset, and laser linewidth induced phase noise.

The decision-directed least mean square (DD-LMS) and cascaded multi-modulus algorithm (MMA) are used in current high-order QAM optical transmission systems. However, the pure DD-LMS or MMA approach performs slow convergence speed and high mean square error (MSE) at the steady state. The performance is not fully satisfied for new-generation high-order QAM optical coherent systems.

Implementations using the disclosed technology may be used to achieve one or more advantages. For example, the performance of a digital coherent optical system can be improved, thereby providing fast convergence speed and low feedback error over the conventional DD-LMS and MMA techniques.

Figure 2:
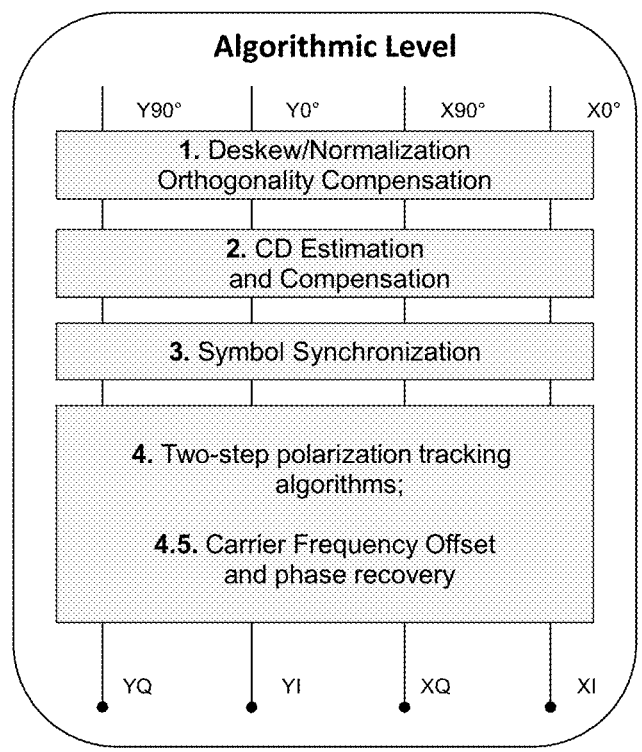
FIG. 2 depicts an exemplary process of digital signal processing (DSP) at a receiver side in an optical communication system.

FIG. 2 illustrates an example demodulation process. As shown in FIG. 2, a blind equalization technique is applied after the front-end imperfection compensation, chromatic dispersion estimation compensation, and timing recovery. The blind equalization technique may be used for 64 QAM and even higher-order modulation formats (256, 1024, or 4096 QAM). Further, the blind equalization technique may be applied for coherent optical systems. In some embodiments, the blind equalization technique includes a two-step polarization tracking and linewidth-tolerant carrier phase recovery.

Some embodiments of a two-step polarization tracking algorithm proceed as follows. In the first step, a combination of two different algorithms is applied in the same loop for fast pre-convergence to the steady state and low time-averaged feedback error (MSE). For example, the combination of constant modulus algorithm (CMA) and DD-LMS algorithm may be applied in the first step. The two algorithms share T/2-spaced time-domain FIR filters with a multiple input multiple output (MIMO) "butterfly" structure. The modified DD-LMS algorithm is followed as the second step for polarization tracking to further minimize the MSE.

For carrier recovery, the frequency offset and carrier phase can be estimated and compensated in the loop of two-step polarization tracking algorithms. They can be also processed after two-step polarization tracking algorithms in self-coherent optical systems. A single-stage blind phase search (BPS) method or hybrid BPS and maximum likelihood (ML) algorithms can be employed for laser linewidth-tolerant phase recovery.

Figure 3:
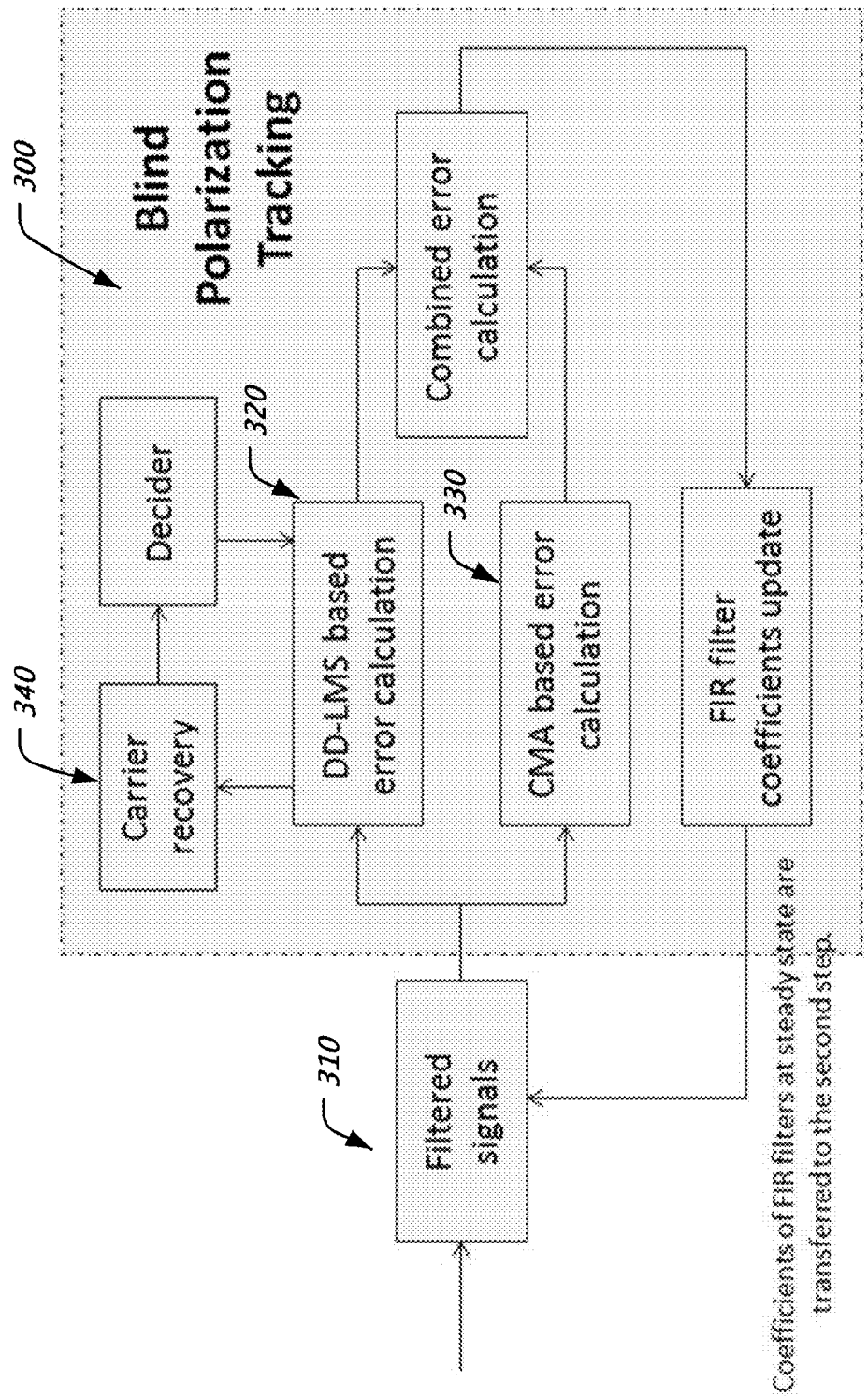
FIG. 3 depicts a block diagram of first-step of two-step polarization tracking process.

FIG. 3 is a block diagram representation of a first-step of two-step polarization tracking process. As shown in FIG. 3, an error estimator block 300 which is positioned after a signal filtering block 310 includes a decision directed error calculation block 320 and a constant modulus based error calculation block 330. In some implementations, the decision directed error calculation block 320 employs DD-LMS algorithm and the constant modulus based error calculation block 330 employs CMA algorithm. Differently from the conventional process of standalone CMA or DD-LMS or cascade CMA and DD-LMS, the error estimator block 300 after signal filtering depends on both CMA and DD-LMS in a parallel way in the loop. Further, the error estimator block 300 includes a carrier recovery block 340. Thus, the error estimator block 300 can involve the carrier recovery in the DD-LMS section for more accuracy decision outputs. Thus, the equalized signals will converge toward both modulus and the nearest decision point, which provides fast convergence speed and low feedback error.

A combined error calculation block provides the output of combined feedback error to update FIR filter coefficients. When the equalization process reaches the steady state, the second-step proceeds with the inherited coefficients as the initial condition.

Figure 4:
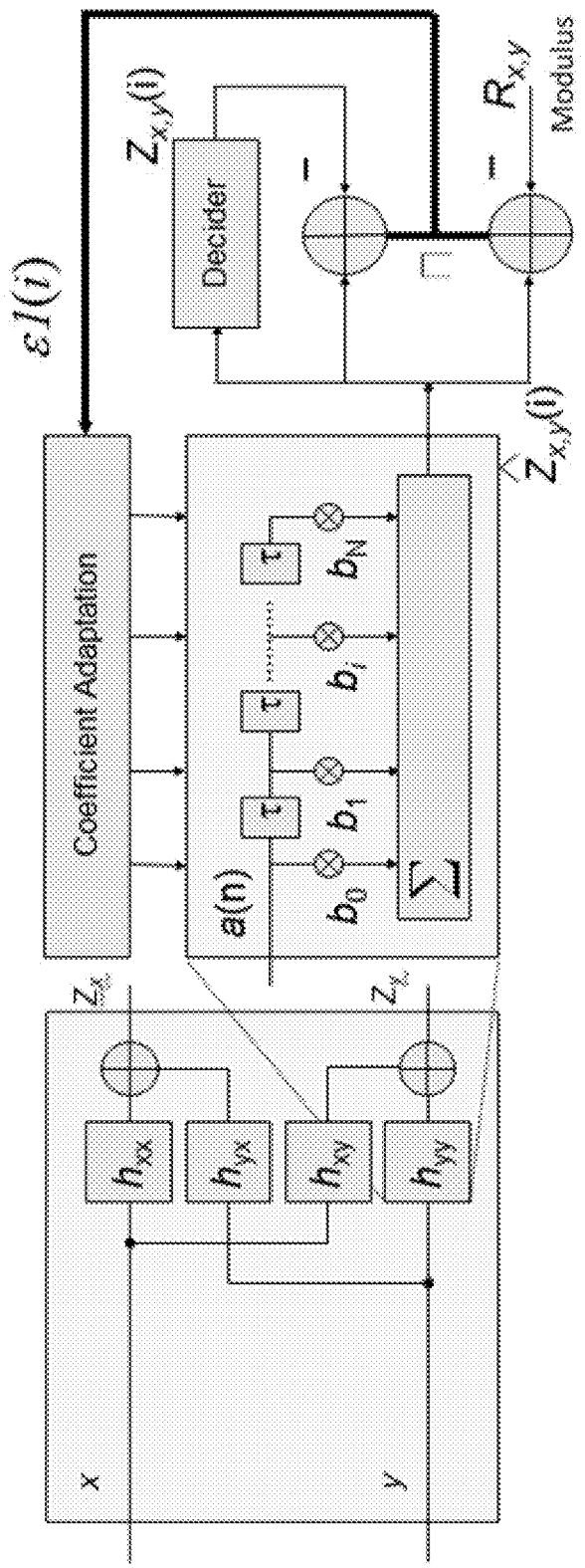
FIG. 4 depicts an exemplary structure of first-step of two-step polarization tracking process.

FIG. 4 describes an exemplary structure of first-step equalization process. In FIG. 4, $\epsilon 1(i)$ denotes the error signal at the first step and Z x,y (i) denotes the equalized received symbols. Further, "i" is the symbol time index and "x" and "y" represent the two incoming orthogonal polarization signals, respectively. The constant modulus Rx,y is provided as:

$$R = E[|Z|^2]/E[|Z|]$$

Where E denotes the statistical expectation and Z represents the decision points.

The feedback error functions are given by the following formulas:

Polarization X with the real, imaginary, and the combined one is provided as:

$$\epsilon 1_{x,Real}(i) = (|Z_{x,Real}(i)|^2 - R_{x,Real}^2) + (|Z_{x,Real}(i)|^2 - Z_{x,Real}^{\hat{}}(i)^2)$$

$$\epsilon 1_{x,Imag}(i) = (|Z_{x,Imag}(i)|^2 - R_{x,Imag}^2) + (|Z_{x,Imag}(i)|^2 - Z_{x,Imag}^{\hat{}}(i)^2)$$

$$\epsilon 1_x(i) = \epsilon 1_{x,Real}(i) + 1i \cdot \epsilon 1_{x,Imag}(i)$$

Polarization Y with the real, imaginary, and the combined one is provided as:

$$\epsilon 1_{y,Real}(i) = (|Z_{y,Real}(i)|^2 - R_{y,Real}^2) + (|Z_{y,Real}(i)|^2 - Z_{y,Real}^{\hat{}}(i)^2)$$

$$\epsilon 1_{y,Imag}(i) = (|Z_{y,Imag}(i)|^2 - R_{y,Imag}^2) + (|Z_{y,Imag}(i)|^2 - Z_{y,Imag}^{\hat{}}(i)^2)$$

$$\epsilon 1_y(i) = \epsilon 1_{y,Real}(i) + 1i \cdot \epsilon 1_{y,Imag}(i)$$

Figure 5:
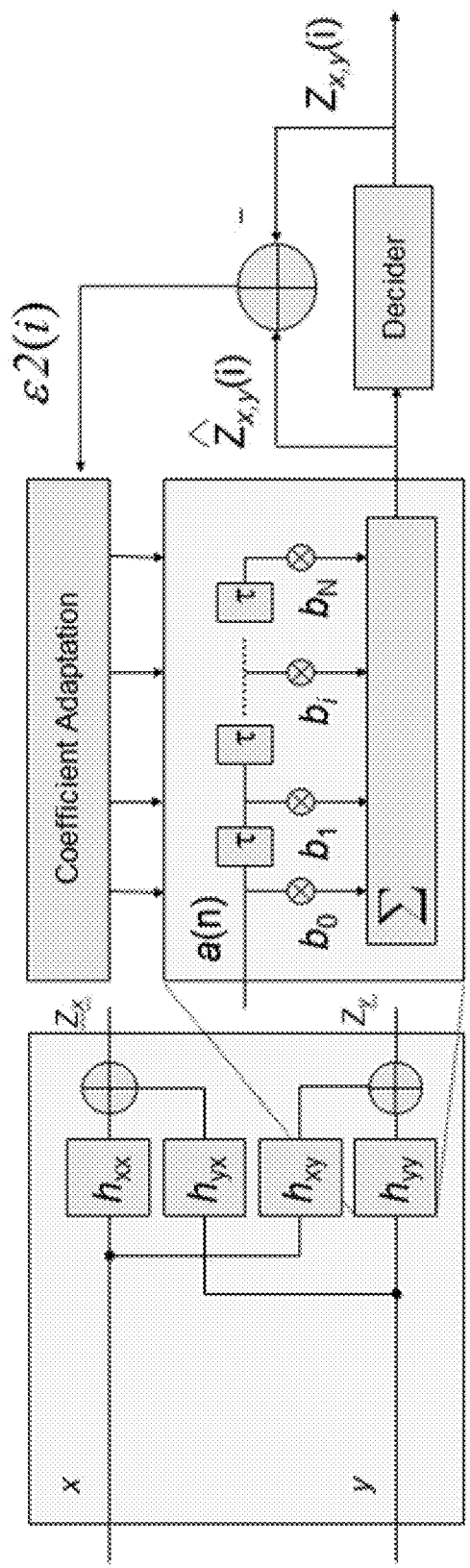
FIG. 5 depicts an exemplary structure of second-step of two-step polarization tracking process.

FIG. 5 describes an exemplary structure of second-step of two-step polarization tracking process. In FIG. 5, $\epsilon 2(i)$ denotes the error signal at the second step and Z x,y (i) denotes the equalized received symbols. Further, "i" is the symbol time index, "x" and "y" represent the two incoming orthogonal polarization signals, respectively.

After the pre-convergence of the first-step to the steady state, the enhanced DD-LMS algorithm is applied to reach lower MSE. The scaling factor of 2 is added in the traditional DD-LMS algorithm.

Polarization X with the real, imaginary, and the combined one is provided as:

$$\epsilon 2_{x,Real}(i) = 2 \cdot (|Z_{x,Real}(i)|^2 - Z_{x,Real}^{\hat{}}(i)^2)$$

$$\epsilon 2_{x,Imag}(i)=2\cdot(|Z_{x,Imag}(i)|^2-Z_{x,Imag}\hat{}(i)^2)$$

$$\epsilon 2_x(i)=\epsilon 2_{x,Real}(i)+1i\cdot\epsilon 2_{x,Imag}(i)$$

Polarization Y with the real, imaginary, and the combined one is provided as:

$$\epsilon 2_{y,Real}(i)=2\cdot(|Z_{y,Real}(i)|^2-Z_{y,Real}\hat{}(i)^2)$$

$$\epsilon 2_{y,Imag}(i)=2\cdot(|Z_{y,Imag}(i)|^2-Z_{y,Imag}\hat{}(i)^2)$$

$$\epsilon 2_y(i)=\epsilon 2_{y,Real}(i)+1i\cdot\epsilon 2_{y,Imag}(i)$$

In two steps of equalization, the coefficient update equations change error signals. The coefficient update equations are provided as follows. The superscript * means complex conjugation.

$$h_{x,x}(i+1)=h_{x,x}(i)-\mu_1\cdot z_x(i)\cdot\epsilon 1_x(i)\cdot x^*(i)$$

$$h_{x,y}(i+1)=h_{x,y}(i)-\mu_1\cdot z_x(i)\cdot\epsilon 1_x(i)\cdot y^*(i)$$

$$h_{y,x}(i+1)=h_{y,x}(i)-\mu_1\cdot z_y(i)\cdot\epsilon 1_y(i)\cdot x^*(i)$$

$$h_{y,y}(i+1)=h_{y,y}(i)-\mu_1\cdot z_y(i)\cdot\epsilon 1_y(i)\cdot y^*(i) \quad \text{Step I:}$$

$$h_{x,x}(i+1)=h_{x,x}(i)-\mu_2\cdot z_x(i)\cdot\epsilon 2_x(i)\cdot x^*(i)$$

$$h_{x,y}(i+1)=h_{x,y}(i)-\mu_2\cdot z_x(i)\cdot\epsilon 2_x(i)\cdot y^*(i)$$

$$h_{y,x}(i+1)=h_{y,x}(i)-\mu_2\cdot z_y(i)\cdot\epsilon 2_y(i)\cdot x^*(i)$$

$$h_{y,y}(i+1)=h_{y,y}(i)-\mu_2\cdot z_y(i)\cdot\epsilon 2_y(i)\cdot y^*(i) \quad \text{Step II:}$$

Because the phase of optical carriers changes much faster than RF carrier, feed-forward based phase recovery is useful for practical implementation. In the meantime, to increase the tolerance toward laser phase noise, a BPS algorithm can be used in combination with two-step polarization tracking algorithms for better phase noise tolerance than conventional Viterbi-Viterbi algorithm. To further reduce the implementation complexity of the BPS algorithm, the hybrid BPS and ML algorithms can also be employed. Carrier phase recovery can be performed in the loop of two-step polarization tracking algorithms. It can also be performed after finishing two-step algorithms.

The effectiveness of the disclosed blind polarization tracking algorithms together with the BPS phase recovery have been verified by both numerical simulation and experimental results.

Figure 6:
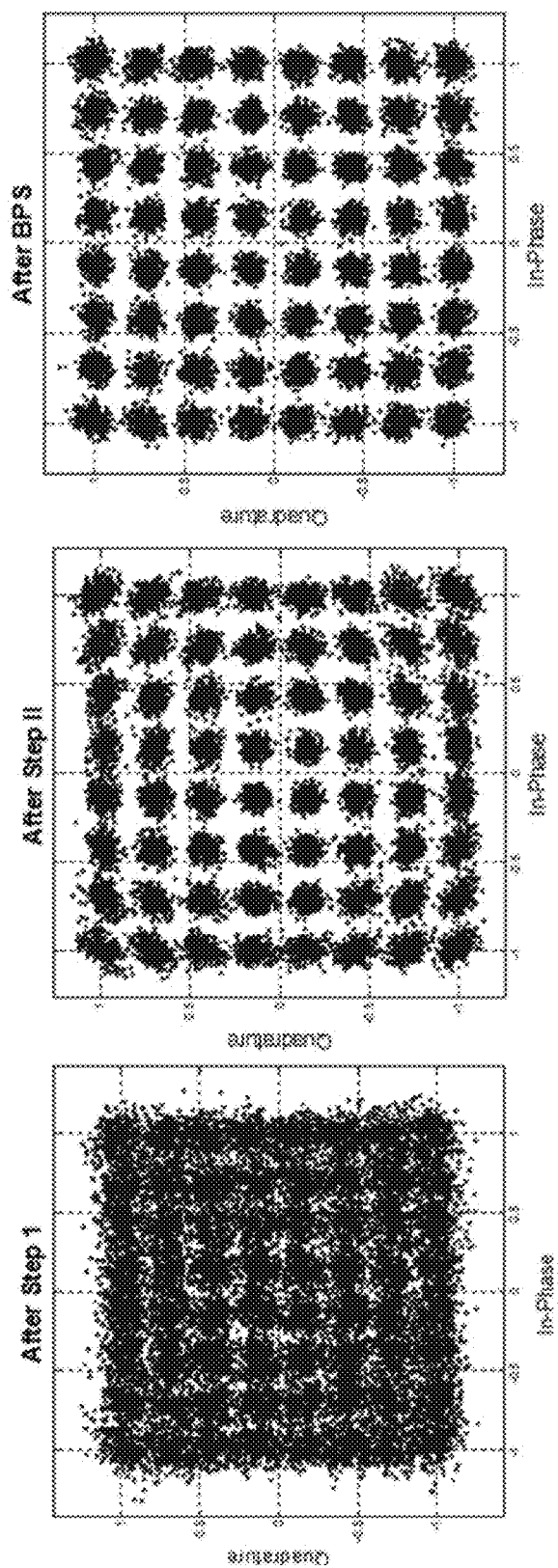
FIGS. 6, 7, 8, 9 and 10 show simulation result examples using a blind equalization employing two-step polarization tracking process.

FIG. 6 shows simulation results that is obtained employing the disclosed blind equalization technique. The simulation results are provided for 40 GBaud PDM-64 QAM signals with OSNR=30 dB, linewidth=50 kHz, $\mu_1=2\hat{}-20$, and $\mu^2=2\hat{}-20$.

Figure 7:
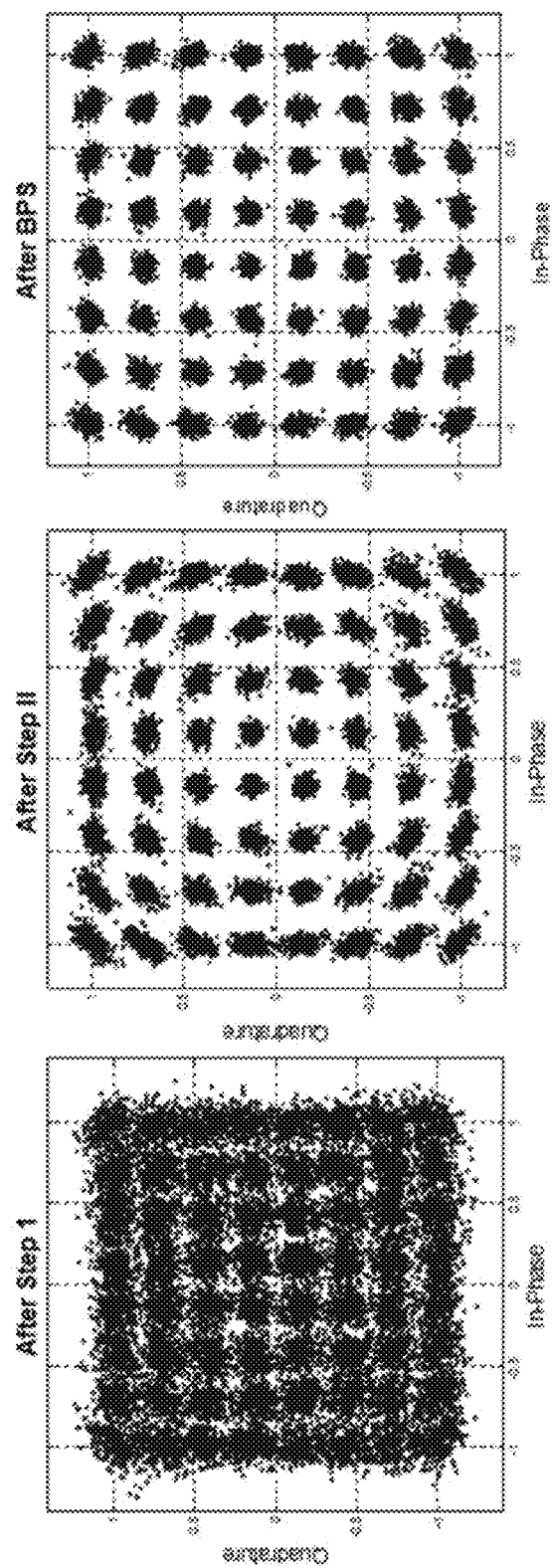

FIG. 7 shows simulation results for 40 GBaud PDM-64 QAM signals with OSNR=35 dB, linewidth=50 kHz, $\mu_1=2\hat{}-20$, and $\mu_2=2\hat{}-20$. The ˆ operator stands for "to the power" or exponential operation.

Figure 8:
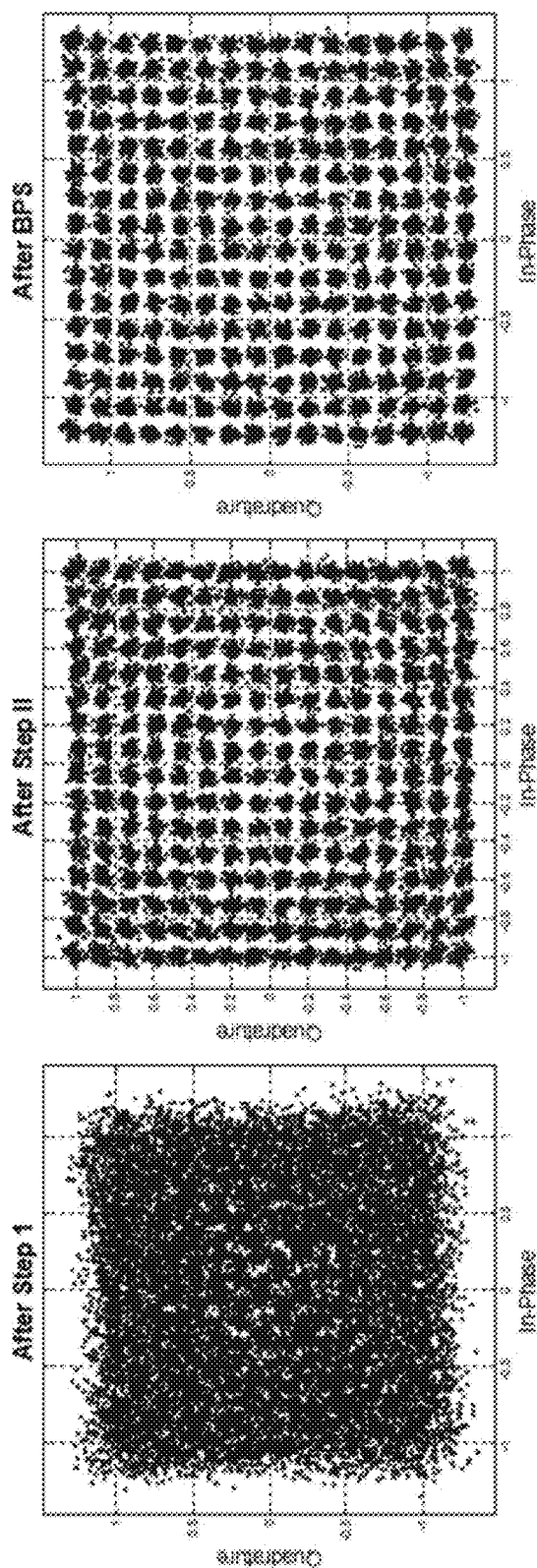

FIG. 8 shows simulation results for 20 GBaud PDM-256 QAM signals with OSNR=35 dB, linewidth=50 kHz, $\mu_1=2\hat{}-25$, and $\mu_2=2\hat{}-25$.

Figure 9:
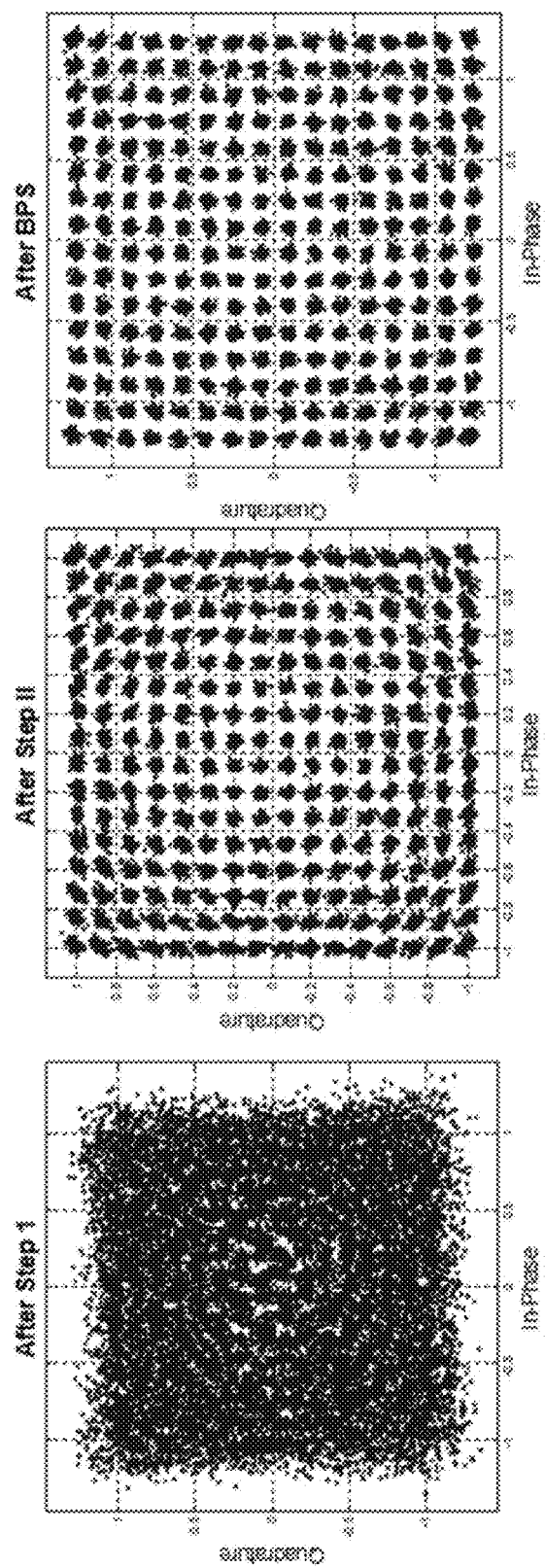

FIG. 9 shows simulation results for 20 GBaud PDM-256 QAM signals with OSNR=38 dB, linewidth=5 kHz, $\mu_1=2\hat{}-25$, and $\mu_2=2\hat{}-25$.

Figure 10:
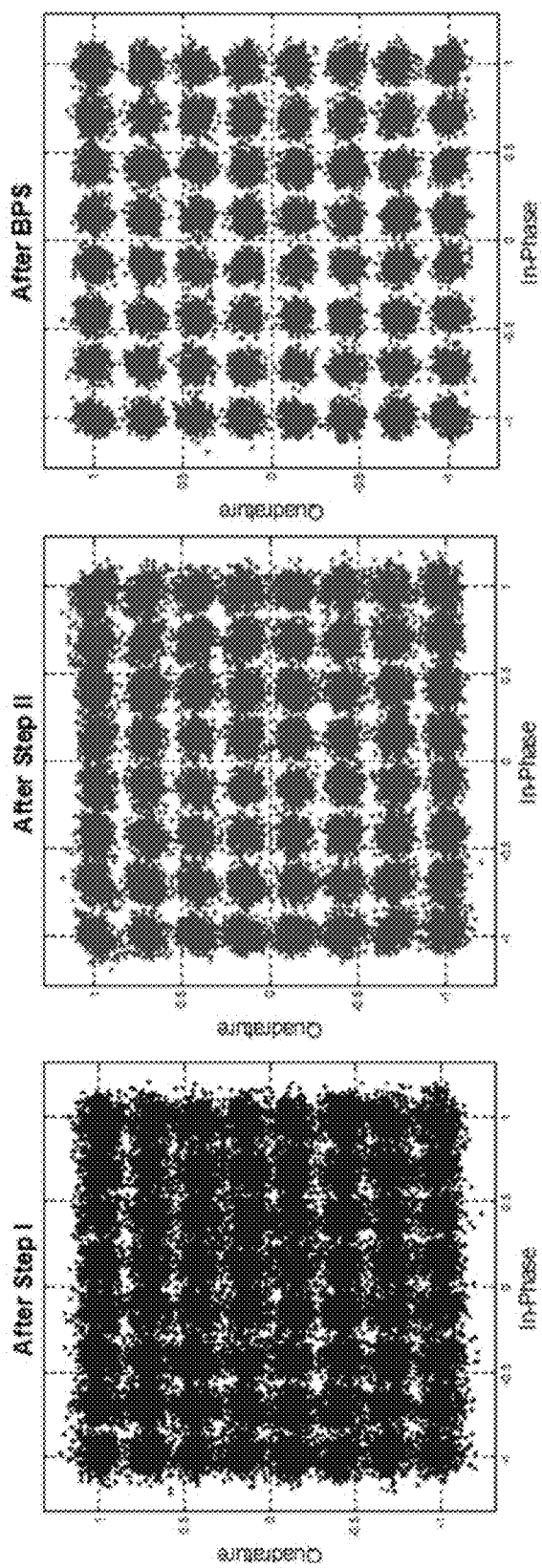

FIG. 10 shows simulation results for 20 GBaud PDM-64 QAM signals with OSNR=30 dB, BER=3.4e−4, $\mu_1=2\hat{}-20$, and $\mu_2=2\hat{}-20$.

Figure 11:
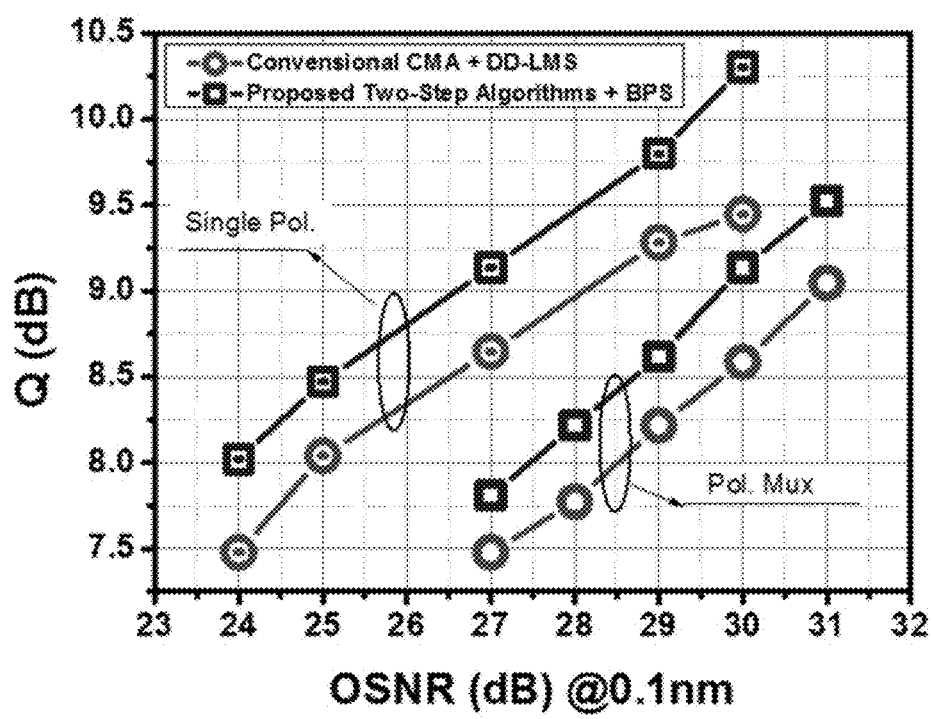
FIG. 11 shows experimental comparison results in terms of the demodulation performance between a conventional equalization process and a blind equalization employing two-step polarization tracking process.

FIG. 11 shows experimental results for performance comparison between the disclosed blind equalization technique and conventional cascade CMA and DD-LMS. As shown in FIG. 11, 1-dB OSNR improvement has been observed for both single-polarization and polarization-multiplexing cases.

Figure 12:
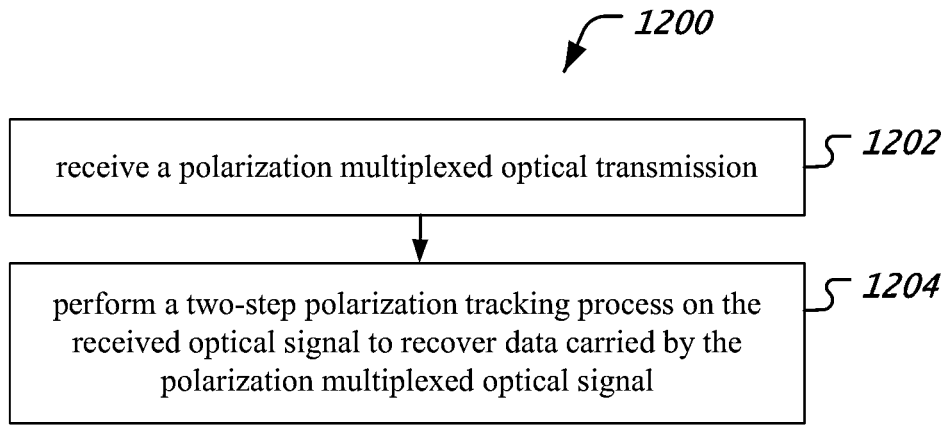
FIG. 12 is a flowchart representation of a method of optical communication.

FIG. 12 is a flowchart representation of a method 1200 of optical communication. The method 1200 may be implemented at a receiver-side in an optical communication network. For example, the method 1200 may be implemented at an optical receiver 106.

At 1202, the method 1200 receives a polarization multiplexed optical transmission. For example, in some embodiments, two polarization multiplexed optical signals (along two orthogonal optical planes) may be received.

At 1204, the method 1200 performs a two-step polarization tracking process on the received optical signal to recover data carried by the polarization multiplexed optical signal.

In some implementations the method 1200 further performs a phase recovery, wherein the performing of the phase recovery is performed during the two-step polarization tracking process or after the two-step polarization tracking process.

In some implementations, the phase recovery is performed using a single-stage blind phase search (BPS) algorithm or hybrid BPS and maximum likelihood (ML) algorithm.

In some implementations, the performing of the two-step polarization tracking process includes performing a first step of the two-step polarization tracking process until an equalization process reaches a steady state and performing a second step of the two-step polarization tracking process using coefficients of FIR finite impulse response (FIR) filters that are obtained at the steady state.

In some implementations, each step of the two-step polarization tracking process employs two different error calculation algorithms in parallel. For example, the two different error calculation algorithms include a decision directed DD-LMS based error calculation and CMAa constant modulus based error calculation.

Figure 13:
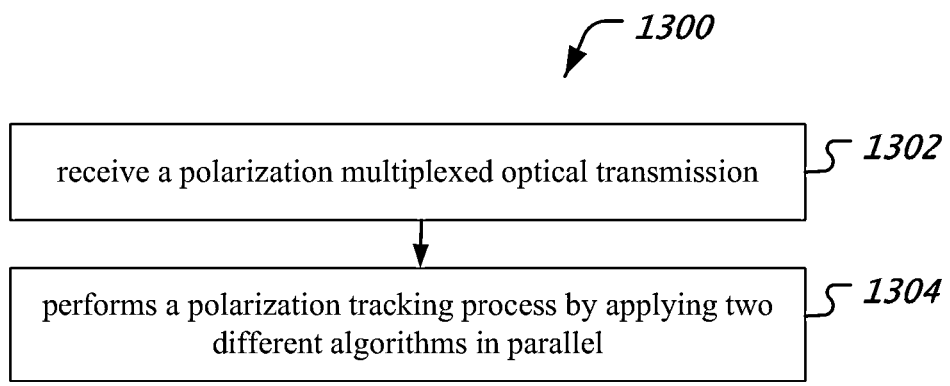
FIG. 13 is another flowchart representation of a method of optical communication.

FIG. 13 is a flowchart representation of a method 1300 of optical communication. The method 1300 may be implemented at a receiver-side in an optical communication network. For example, the method 1300 may be implemented at an optical receiver 106.

At 1302, the method 1300 receives a polarization multiplexed optical transmission. For example, in some embodiments, two polarization multiplexed optical signals (along two orthogonal optical planes) may be received.

At 1304, the method 1300 performs a polarization tracking process by applying two different algorithms in parallel.

In some implementations, the method further performs a phase recovery, wherein the performing of the phase recovery is performed during the two-step polarization tracking process or after the two-step polarization tracking process.

In some implementations, the phase recovery is performed using a single-stage blind phase search (BPS) algorithm or hybrid BPS and maximum likelihood (ML) algorithm.

In some implementations, the operation of performing of the polarization tracking process includes: performing a first step of the two-step polarization tracking process until an equalization process reaches a steady state and performing a second step of the two-step polarization tracking process using coefficients of FIR filters that are obtained at the steady state.

In some implementations, each step of the two-step polarization tracking process employs two different error calculation algorithms in parallel. For example, the two different error calculation algorithms include a decision directed error calculation and a constant modulus DD-LMS based error calculation and CMA based error calculation.

Implementation Examples of DD-LMS and Cascaded Multi-Modulus Algorithm

Figure 14:
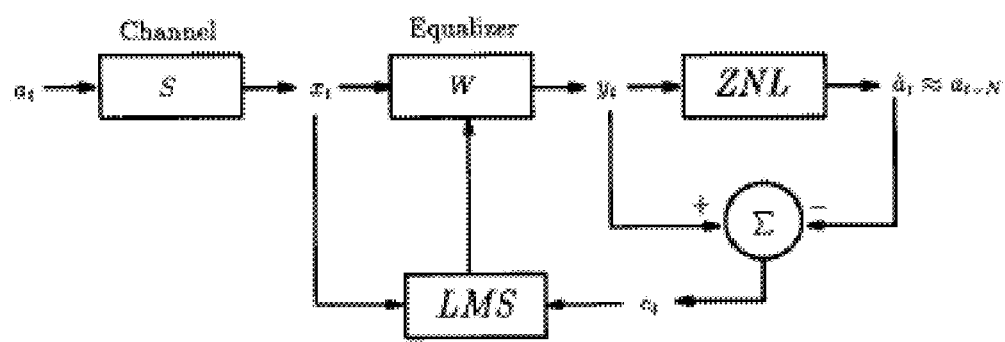
FIG. 14 shows an example of a system where a decision directed least means square (DD-LMS) algorithm can be implemented.

FIG. 14 shows an example of a system where a decision directed least means square (DD-LMS) algorithm can be implemented. A sequence of data $a_t$ is sent through a linear channel of unknown impulse response S. When a specific modulation scheme is used for modulation on the transmit-side, the data $a_t$ may (ideally) fall on one of the constellation points.

At the receiver-side, the data $a_t$ received through the channel S may be passed through a transfer function W that represents inverse channel function (e.g., $S^{-1}$). A zero-order (memoryless) nonlinear process (ZNL) may be used to decide (or map) the observed outputs $y_t$ into one of the set of known symbol values. In general, and often ideally, the output symbol decisions $y_t$ are a delayed version of the input symbols $a_t$.

In a decision-directed least mean square (DD-LMS) technique, the ZNL process may be a simple threshold device. For example, in the case of at being a binary sequence, a DDLMS algorithm may simply attempt to minimize the expected value of the different between symbol decisions and the corresponding input symbols, represented as $E[(y_t-a \ sign(y_t))^2]$.

A constant modulus algorithm further exploits the knowledge about transmitted symbols, e.g., when QPSK modulation is used, that the symbols have a constant modulus.

It will be appreciated that techniques for receiving polarization multiplexed modulated optical signals and recovering data bits from the received signals are disclosed. In some embodiments, receiver-side processing can be reduced and/or processing time can be reduced by using two different optimization or signal tracking algorithms in parallel in a first step of demodulation, followed by a second step of signal processing. One of the two algorithms used in parallel may, e.g., be decision based, and thus may minimize error of calculations based on how far away a decision point is in signal being demodulated. DD-LMS is one example of such an algorithm. Another algorithm used in parallel in the first step may optimize by minimizing a measure of how far away from an optimal sampling point the obtained sample is. The CMA is an example of such an algorithm.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a receiver-side in an optical communication network, comprising:
   receiving a polarization multiplexed optical signal; and
   performing a two-step polarization tracking process on the received optical signal to recover data carried by the polarization multiplexed optical signal; and
   performing a phase recovery;
   wherein the two-step polarization tracking process includes a first step and a second step;
   wherein the first step employs two different error calculation algorithms in parallel to produce estimated coefficients of a finite impulse response process having a first mean square error (MSE);
   wherein the second step inherits the estimated coefficients as an initial condition and updates the estimated coefficients for data recovery to obtain a second MSE that is lower than the first MSE; and
   wherein the phase recovery is performed during the two-step polarization tracking process using a hybrid binary phase search (BPS) and a maximum likelihood (ML) algorithm.

2. The method of claim 1, the performing of the two-step polarization tracking process including:
   performing the first step of the two-step polarization tracking process until an equalization process reaches a steady state; and
   performing the second step of the two-step polarization tracking process using coefficients of finite impulse response (FIR) filters that are obtained at the steady state.

3. The method of claim 1, wherein the two different error calculation algorithms include a decision directed error calculation and a constant modulus based error calculation.

4. An optical receiver apparatus, comprising:
   a receiver module that receives an optical signal;
   a polarization tracking module that calculates feedback error and updates coefficients of a finite impulse response (FIR) process by performing a two-step polarization tracking process on the received optical signal, thereby providing digital signals,
   wherein the two-step polarization tracking process comprises a first step that employs two different error calculation algorithms in parallel to produce estimated coefficients of the finite impulse response process having a first mean square error (MSE) and a second step that inherits the estimated coefficients as an initial condition to and updates the estimated coefficients to obtain a second MSE that is lower than the first MSE; and
   a carrier recovery module performing a phase recovery by receiving the digital signals and estimating an optimal phase angle of the digital signals,
   wherein the phase recovery is performed during the two-step polarization tracking process using a hybrid binary phase search (BPS) and a maximum likelihood (ML) algorithm.

5. The apparatus of claim 4, wherein the polarization tracking module is configured to perform a first step of the two-step polarization tracking process to reach a steady state and perform a second step of the two-step polarization tracking process using coefficients of FIR filters that are obtained at the steady state.

6. The apparatus of claim 4, wherein the two different error calculation algorithms include decision directed least mean square (DD-LMS) based error calculation and the second error calculation algorithm includes constant modulus algorithm (CMA) based error calculation.

7. An optical receiver apparatus, comprising:
   a computer-readable memory that stores program instructions, and
   a digital signal processor that reads the program instructions and implements a method, comprising:
   receiving a polarization multiplexed optical signal;
   performing a two-step polarization tracking process on the received optical signal to recover data carried by the polarization multiplexed optical signal; and
   performing a phase recovery;
   wherein the two-step polarization tracking process includes a first step and a second step;
   wherein the first step employs two different error calculation algorithms in parallel to produce estimated coefficients of a finite impulse response process having a first mean square error (MSE);
   wherein the second step inherits the estimated coefficients as an initial condition and updates the estimated coefficients for data recovery to obtain a second MSE that is lower than the first MSE; and
   wherein the phase recovery is performed during the two-step polarization tracking process using a hybrid binary phase search (BPS) and a maximum likelihood (ML) algorithm.

8. The apparatus of claim 7, wherein the performing of the two-step polarization tracking process includes:
   performing the first step of the two-step polarization tracking process until an equalization process reaches a steady state; and
   performing the second step of the two-step polarization tracking process using coefficients of finite impulse response (FIR) filters that are obtained at the steady state.

9. The apparatus of claim 7, wherein the two different error calculation algorithms include a decision directed error calculation and a constant modulus based error calculation.

10. The method of claim 1, wherein the second step employs a decision directed error calculation algorithm.

11. The method of claim 10, wherein a scaling factor of 2 is added to the decision directed error calculation algorithm.

12. The apparatus of claim of 4, wherein the second step employs an enhanced decision directed least mean square (DD-LMS) based error calculation algorithm.

13. The apparatus of claim of 12, wherein a scaling factor of 2 is added to the enhanced DD-LMS based error calculation algorithm.

14. The apparatus of claim 7, wherein the second step employs a decision directed error calculation algorithm.

15. The apparatus of claim 14, wherein a scaling factor of 2 is added to the decision directed error calculation algorithm.

* * * * *